United States Patent
Quattrini et al.

(10) Patent No.: US 10,210,367 B1
(45) Date of Patent: Feb. 19, 2019

(54) OPTICAL ASSEMBLY FOR SCANNING ENGINE

(71) Applicant: Datalogic IP Tech S.r.l., Bologna (IT)

(72) Inventors: Paolo Quattrini, Sala Bolognese (IT); Marco Gnan, Bologna (IT)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 15/852,036

(22) Filed: Dec. 22, 2017

(51) Int. Cl.
- *G06K 7/00* (2006.01)
- *G06K 7/10* (2006.01)
- *F21V 8/00* (2006.01)
- *G08B 5/36* (2006.01)
- *H05B 33/08* (2006.01)

(52) U.S. Cl.
CPC ....... *G06K 7/10831* (2013.01); *G02B 6/0096* (2013.01); *G06K 7/10841* (2013.01); *G06K 7/10881* (2013.01); *G08B 5/36* (2013.01); *H05B 33/0857* (2013.01)

(58) Field of Classification Search
CPC .... G06K 7/1417; G06K 7/10722; G06K 7/14; G06K 19/06037; G06K 7/10732
USPC ................. 235/435, 439, 454, 470
See application file for complete search history.

(56) References Cited

U.S. PATENT DOCUMENTS

| 4,692,603 A * | 9/1987 | Brass ............... G06K 7/015 235/454 |
| 6,808,114 B1 | 10/2004 | Palestini et al. |
| 7,387,246 B2 | 6/2008 | Palestini et al. |
| 7,533,824 B2 | 5/2009 | Hennick et al. |
| 8,089,351 B2 | 1/2012 | Eich et al. |
| 2003/0047607 A1* | 3/2003 | Swanson ............ G06K 7/14 235/454 |

OTHER PUBLICATIONS

"The Data-Logic Green Spot," advertisement, 2010, 2 pages.

\* cited by examiner

*Primary Examiner* — Jamara Franklin
(74) *Attorney, Agent, or Firm* — The Juhasz Law Firm

(57) ABSTRACT

In a handheld scanning device, a support frame configured to physically support an indicia scanning engine configured to scan and interpret an indicia and a light pipe within a casing of a scanning device. The light pipe extends along and flush against a surface of a planar portion of the support frame. Multiple ribs of elongate shape are formed integrally with the planar portion. A plurality of the ribs of the multiple ribs each define a gap in the elongate shape through which the light pipe may extend. The support frame may support the indicia scanning engine and the light pipe in predetermined relative positions to cause a central projection axis along which light is projected from an outlet end of the light pipe to extend in parallel with a central scanning axis extending from a front end of the indicia scanning engine, and toward a surface that carries the indicia.

23 Claims, 10 Drawing Sheets

OPTICAL ASSEMBLY FOR SCANNING ENGINE

BACKGROUND OF THE INVENTION

1. Field of the Invention

The present invention relates to devices for optically capturing and decoding encoded data and more particularly to an apparatus and a method for confirming that an indicia carried has been successfully captured and decoded by a scanning device.

2. Description of the Related Art

Scanning devices are well known and used in a wide range of enterprise applications. For example, barcode scanners are regularly used in connection with checkout stations at supermarkets and other retail establishments for reading barcodes on consumer goods. They are also useful in inventory collection and control for warehousing, shipping and storage of products.

Handheld scanning devices are generally carried by a user and used by aiming the scanner along a line-of-sight toward an indicia (e.g., barcode) on carried on a surface of an object. Such scanning devices may also project light that serves to guide a user in aiming the scanning device at the indicia.

The scanning and/or decoding of an indicia can give negative results for various reasons. For example, damage to a label of an object that bears the indicia may give a false or garbled read of the data encoded in the indicia or an entirely failed read. As another example, correct operation of a scanning device may require a user to maintain an appropriate distance between the scanning device and the indicia. An attempt at capturing an indicia at a distance other than this appropriate distance may also lead to a false or garbled read, or to no read at all. In addition, even when an indicia is correctly captured, its decoding may result in barcode reading errors because, for example, it does not fall within the categories of types of indicia that the scanning device is capable of recognizing. In any event, the user needs to be given an indication of whether the indicia has been properly captured and decoded before proceeding to use the scanning device to capture and decode another indicia.

These problems may be especially severe with handheld scanning devices since a handheld scanning device allows a user a wide range of movement and positioning of the handheld scanning device with respect to an indicia. Thus, for at least handheld scanning devices, simple indicator may be provided for indicating to the user that the particular aimed-at indicia has been successfully captured and decoded by the scanning device. This confirmation is typically provided with an audible indicator, such as a "good-read beep."

Unfortunately, depending on the environment in which the scanning device is used, it is not always possible to hear such a beep indicator. Also, in other situations such as hospital patient rooms or libraries, it may not be desirable to have repeated audible output of beep sounds occurring as multiple indicia are scanned. To address these concerns, other scanning devices have been provided with a visual indicator that provide visual feedback concerning whether an indicia was successfully captured and decoded. Illustrative of such an optical indicator device is a technology developed by the Applicant known in the industry as the "Green Spot" indicator, which is a luminous green dot that is projected by a handheld scanning device onto a surface of an object at a location relatively close to the location of the indicia when the indicia has been successfully scanned and decoded. This "good-read" feedback provides visual confirmation to the user that the particular aimed optical code has been decoded by the reader of the scanning device. The "green spot" technology has been adopted in a wide range of applications including and beyond environments where silent scanning of indicia is preferred or in environments that are too noisy to allow for hearing beep sounds and/or other forms of audible indications.

Handheld scanning devices have long been available in wide variety of physical configurations, but are usually all designed to be physically compact to enhance their portability. To achieve such compactness, components within the casings of such handheld scanning devices are typically densely packed together within the casings, thereby leaving little room for the addition of even one more component to provide even one more relatively simple feature. Often exacerbating this situation is the need to design handheld scanners to provide considerable physical protection of sensitive electronic and/or optical components against physical shocks resulting from instances of handheld scanners being dropped and/or subjected to other types of physical impacts. Thus, what little space may be available between electronic and/or optical components can often be consumed by structural supports that may need to be relatively bulky to have sufficient strength to provide sufficient protection to the more sensitive electronic and/or optical components.

As a result, efforts to add such a visual indicator as the "Green Spot" to a handheld scanning device may be greatly hampered by an inability to find sufficient and/or suitably configured physical space in which to install the requisite components. Thus, an optical hardware system for providing visual feedback to a user of a scanning device that can be incorporated into such a scanning device is needed.

SUMMARY OF THE INVENTION

Technologies are described for optical barcode scanning devices, and in particular to an optical hardware system configured to make more efficient use of the limited space typically available in handheld scanning devices.

In one aspect, in a handheld scanning device, a support frame may be configured to physically support both an indicia scanning engine configured to scan and interpret an indicia and a light pipe within a casing of a scanning device. The support frame may include a planar portion that extends between the indicia scanning engine and the light pipe, wherein an external surface of a middle length of the light pipe extends along and flush against a planar surface of the planar portion of the support frame. A holder may be formed integrally with the planar portion to support a light source in a position aligned with an inlet end of the light pipe to enable light emitted by the light source to reach the inlet end. Multiple ribs of elongate shape may be formed integrally with the planar portion. The multiple ribs may extend from the planar surface of the planar portion to strengthen the support frame. A plurality of the ribs of the multiple ribs may each define a gap in the elongate shape through which the middle length of the light pipe may extend. The support frame may support the indicia scanning engine and the light pipe in predetermined relative positions to cause a central projection axis along which light is projected from an outlet end of the light pipe to extend in parallel with a central scanning axis extending from a front end of the indicia scanning engine, and toward a surface that carries the indicia.

In another aspect, a scanning device may include an indicia scanning engine, a light source, a light pipe, and a support frame. The indicia scanning engine may be configured to scan an indicia carried on a surface. The light pipe may be formed of a transparent material, and include an inlet end to receive light emitted by the light source, an elongate middle length, and an outlet end to project light conveyed through the light pipe from the inlet end and through the middle length to outlet end. The support frame may be configured to physically support the indicia scanning engine and the light pipe in predetermined relative positions within a casing of the scanning device to cause a central projection axis along which light is projected from the outlet end to extend in parallel with a central scanning axis extending from a front end of the indicia scanning engine, and toward the surface that carries the indicia. The support frame may include a planar portion that extends between the indicia scanning engine and the light pipe. An external surface of the middle length of the light pipe may extend along and flush against a planar surface of the planar portion of the support frame.

DETAILED DESCRIPTION OF THE INVENTION

Figure 1A:
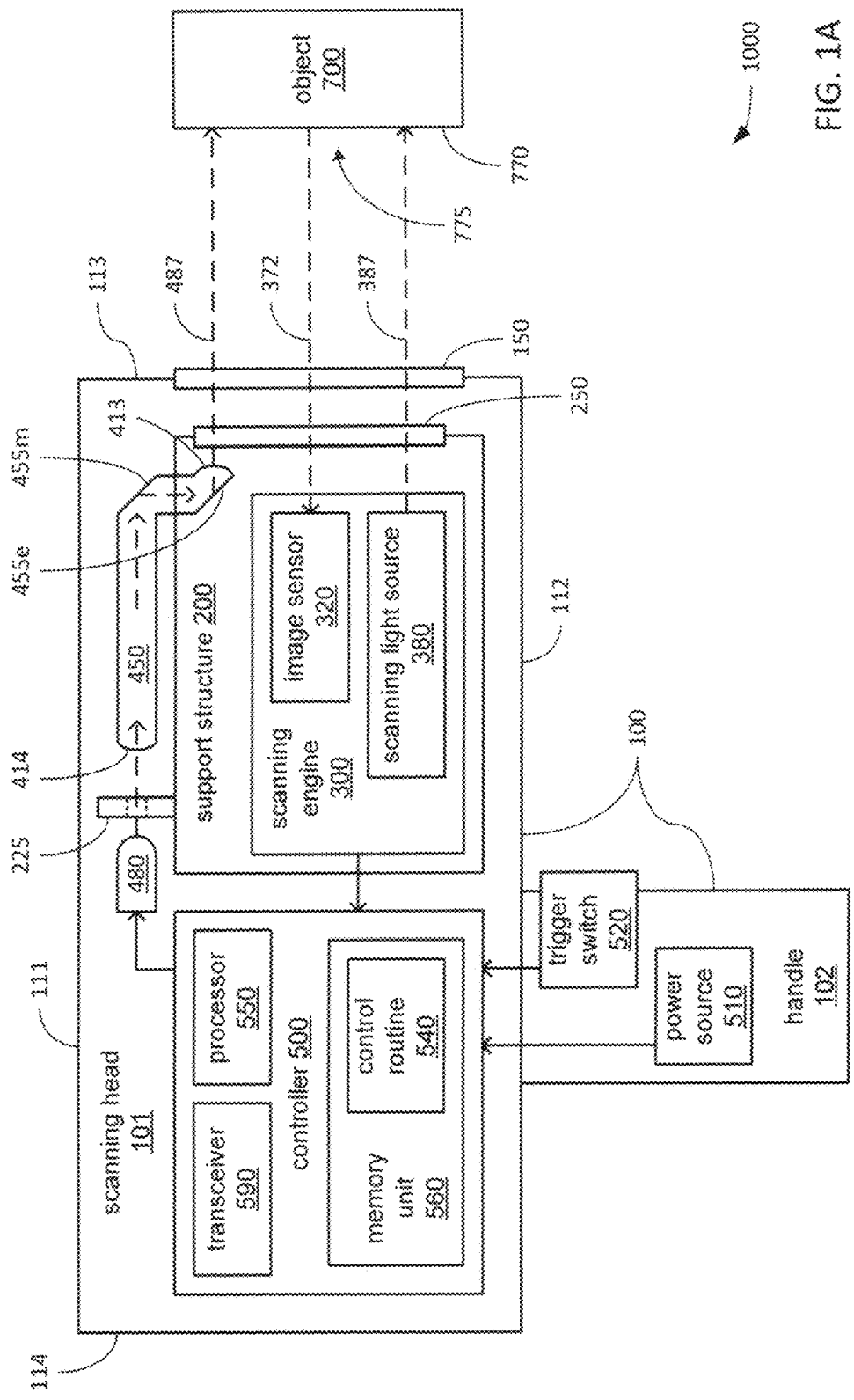
FIGS. 1A and 1B, collectively referred to herein as FIG. 1, show aspects of an internal architecture for a first illustrative embodiment and a second illustrative embodiment, respectively, of a system for an optical assembly for a scanning engine according to this disclosure.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is an optical hardware system able to make more efficient use of physically limited space within a handheld scanning device to provide an optical indicator of success in capturing and decoding an indicia carried on a surface of an object. Broadly speaking, in a scanning device, a support frame may be configured to physically support both an indicia scanning engine configured to scan and interpret an indicia and a light pipe within a casing of a scanning device. The light pipe extends along and flush against a surface of a planar portion of the support frame. Multiple ribs of elongate shape may be formed integrally with the planar portion. A plurality of the ribs of the multiple ribs each define a gap in the elongate shape through which the light pipe may extend. The support frame may support the indicia scanning engine and the light pipe in predetermined relative positions to cause a central projection axis along which light is projected from an outlet end of the light pipe to extend in parallel with a central scanning axis extending from a front end of the indicia scanning engine, and toward a surface that carries the indicia.

Figure 1B:
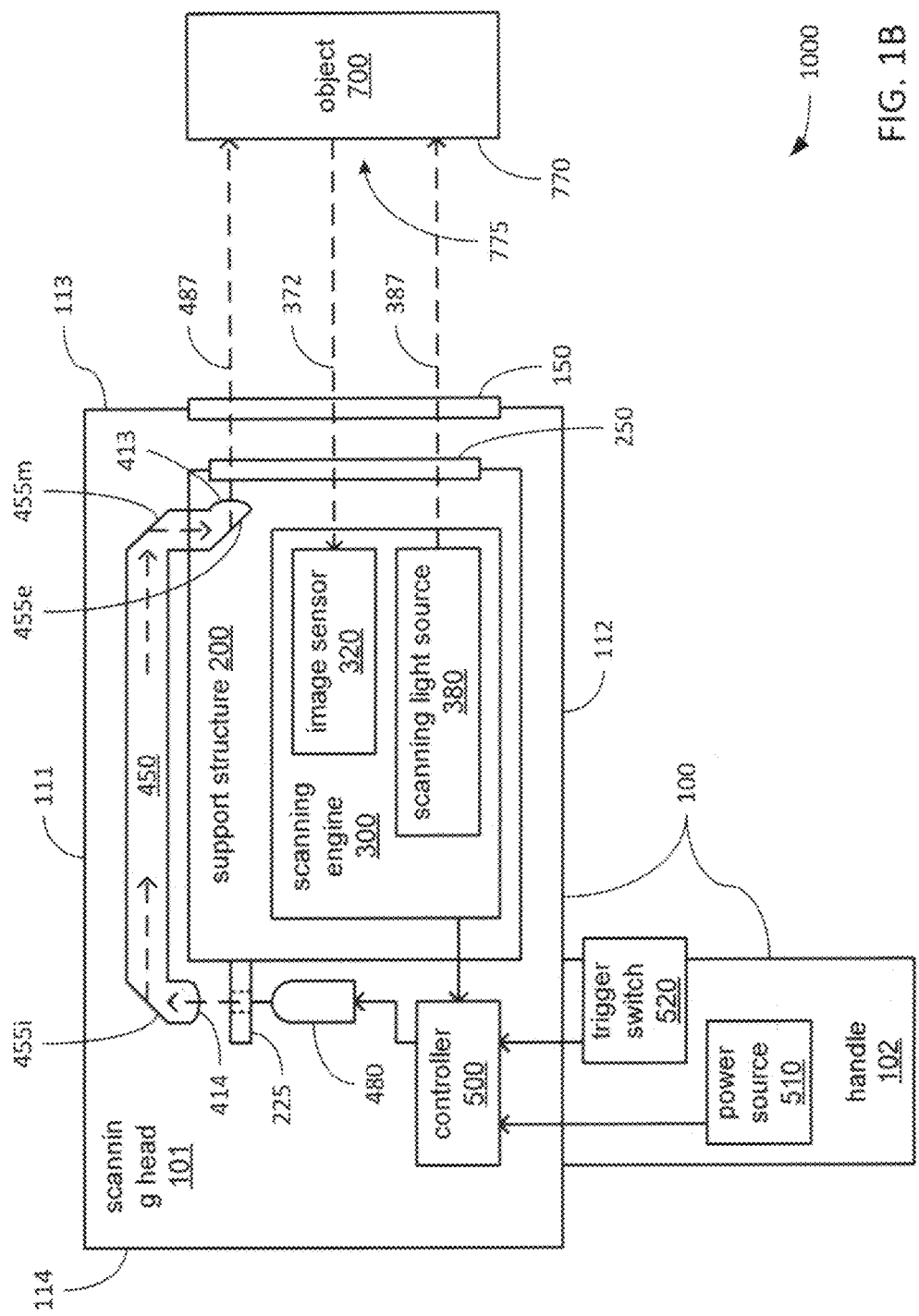

Turning now to the figures, FIGS. 1A and 1B, collectively referred to herein as FIG. 1, show aspects of an internal architecture for a first illustrative embodiment and a second illustrative embodiment, respectively, of a system for an optical assembly for a scanning engine according to this disclosure. More specifically, FIG. 1 depicts aspects of an example embodiment of a system 1000 of an internal architecture for a system for an optical assembly for a scanning engine according to this disclosure.

Turning more specifically to FIG. 1A, a conceptual view is provided of an internal architecture for a first system 1000 for an optical assembly for a scanning engine according to this disclosure. The first system 1000 includes a scanning device 100 and an object 700 that carries an indicia 775 to be scanned.

The scanning device 100 includes a scanning engine 300 and a controller 500 mounted in a scanning head 101 of the handheld scanner device 100. The scanning device 100 is capable of scanning, that is, capturing and decoding the indicia 775. The indicia 775 may be any of a variety of forms of bar code or quick-response (QR) code, including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; PostBar; POSTNET; RM4SCC/KIX; Telepen; UPC; Aztec Code; Code 1; ColorCode; Color Construct Code; CrontoSign; CyberCode; d-touch; Data-Glyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode The object 700 carrying the indicia 775 may be any of a variety of objects that may carry any of a variety of forms of the indicia 775 on a surface 770 of the object 700, including and not limited to, a package carrying a shipping label that includes the indicia 775, or a product for sale within retail packaging on which the indicia is printed as part of the graphical artwork thereof. The indicia 775 may encode data, including and not limited to, data indicating the addresses of the sender and intended recipient of a package, or data providing a universal product code (UPC) that uniquely identifies a product for sale.

The scanning device 100 may be given a physical configuration that defines a distinct scanning head 101 joined to a handle 102. The scanning head 101 includes a portion of the casing of the scanning device 100 that includes a top surface 111, a bottom surface 112, a front end 113 and a rear end 114. Together, the top surface 111, bottom surface 112, front end 113, and rear end 114 define the shape of the scanning head 101. The shape of the casing of the scanning head 101 is a matter of design choice. The casing of the scanning head 101 further includes a scanning window 150 formed of a transparent material. The scanning window 150 may be positioned at the front end 113 of the scanning head 101 such that the front end 113 is to be pointed at the indicia 775 as part of scanning the indicia 775.

The scanning head 101 may carry circuitry of the handheld scanning device 100, including a scanning engine 300 and a controller 500 within a hollow interior region thereof. The scanning engine 300 may be adapted to capture image frames of whatever objects may be within a field of view (FOV) thereof that may extend along a central scanning axis 372. The controller 500 may be adapted to decode the indicia 775 within one of such captured image frames. The degree of spread and/or other aspects of the FOV may be at least partially determined by the characteristics of the image sensor 320, including its light-sensitive elements and/or any optical components (e.g., lenses, diaphragms and/or filters) thereof. Alternatively or additionally, aspects of the FOV may be determined by the distance of the scanning device 100 from the indicia 775 and/or the orientation of the scanning device 100 relative to the indicia 775.

The scanning engine 300 includes an image sensor 320 and associated circuitry. The image sensor 320, also referred to as the imaging camera assembly, is a device well known in the art and typically includes a set of focusing optics (not shown) that may include one or more imaging lens and an image sensor that may include an array ("sensor array") of light-sensitive elements that may be incorporated into a semiconductor device (not shown). In various embodiments, the array of light-sensitive elements may be either a one-dimensional array or a two-dimensional array. The choice between one-dimensional and two-dimensional arrays may be at least partially determined by whether the indicia 775 is expected to be a one-dimensional indicia (e.g., a barcode) or a two-dimensional indicia (e.g., a QR code).

The light sensitive elements may be based on any of a variety of technologies and/or may be implemented with any of a variety of light-sensing devices, including and not limited to, a charge-coupled device (CCD) that may provide either of the aforementioned one-dimensional array of light sensors operated to sweep over the indicia 775 during capture, or the aforementioned two-dimensional array to capture two-dimensional images of the indicia 775 in a manner akin to a camera.

The scanning engine 300 may also include a scanning light source 380 that may emit various forms of collimated and/or monochromatic light, including light that projects any of a variety of patterns onto the surface 770 of the object 700 where the indicia 775 is carried when the scanning device 100 is correctly aimed at the indicia 775. As will be familiar to those skilled in the art, such emission of light may be to provide sufficient illumination to ensure that the indicia 775 is sufficiently visible to the image sensor 320 to be successfully captured. Alternatively or additionally, the light emitted by the scanning light source 380 may provide a visible pattern of markers on the surface 770 of the object 700 and/or on the indicia 775 as a guide for determining the orientation of the indicia 775 relative to the image sensor 320 as part of improving the accuracy with which the indicia 775 is decoded to retrieve data encoded therein. The light emitted by the scanning light source 380 may be projected therefrom along a central illumination axis 387. In some embodiments, the axes 372 and 387 may be arranged to extend in parallel to each other.

The scanning light source 380 may incorporate one or more light-emitting diodes (LEDs). Alternatively, the scanning light source 380 may incorporate any of variety of other lighting elements based on any of a variety of technologies, including and not limited to, a cold cathode fluorescent (CCFL) lamp. The scanning light source 380 may also include various optical components (e.g., lenses, diaphragms, etc.) to collimate and/or otherwise modify light produced by one or more lighting elements within the scanning light source 380 as part of projecting light along the central illumination axis 387. The light so projected may have a selected degree of spread that, in some embodiments, may be so selected to substantially coincide with the degree of spread of the FOV of the image sensor 320.

The scanning light source 380 may additionally serve as an aiming system that projects light to create a pattern on surfaces that may guide a user of the scanning device 100 in aiming the scanning device 100 at the indicia 775 well enough to place the indicia 775 within the FOV of the image sensor 320. In so doing, the scanning light source 380 may employ one or more lighting elements and/or optical components that may be separate and distinct from those employed in projecting light to illuminate the indicia 775, as earlier described. Such an alternate lighting element may be of a type and/or based on a technology that may be entirely different from any lighting element used to illuminate the indicia 775. By way of example, such an alternate lighting element may be a laser LED.

The handle 102 may be adapted to be grasped by a user's hand to enable the user to and adapted to the scanning head 101. A lower part of the handle 102 may be adapted to be received in a docking station (not shown) positioned on a substrate such as a table or sales counter to allow the scanning device 100 to be used in a stationary configuration. The handle 102 may carry a power source 510 within a hollow interior region thereof. The power source 510 may be connected to the scanning engine 300 and the controller 500 to provide electric power thereto.

The power source 510 may be any of a variety of types of storage device to store electrical energy that may be based on any of a wide variety of energy storage technologies that enables recharging, including and not limited to, nickel-cadmium (NiCd), nickel-metal hydride (NiMH), lithium-ion and/or lithium-polymer. When the handle 102 is coupled to a docking station, the power source 510 may be receive electrical power therefrom by which the power source 510 is recharged, while the scanning device 100 may be used in a stationary mode.

Also carried partially within the hollow interior region, but also extending outward therefrom, may be trigger switch 520. More specifically, a portion of the trigger switch 520, and/or button cap mechanically coupled to the trigger switch 520, may extend from within the hollow interior of handle 102 and out into the environment external to the handle 102 to enable manual operation of the trigger switch 520 by a user of the scanning device 100. The trigger switch 520 and/or the button cap thereof may have a physical configuration and my extend in a forward direction from within the handle 102 in a manner that cooperates with the shape of the casing of the scanning device 100 to give the scanning device 100 a "gun-like" physical configuration that may assist in making operation of the scanning device 100 by a user easier and/or more intuitive.

The controller 500 may be coupled to the trigger switch 520 and the scanning engine 300 to control aspects of the operation of the scanning engine 300 in response to manual operation of the trigger switch 520. More specifically, in response to manual operation of the trigger switch 520, the controller 500 may operate the scanning light source 380 to illuminate whatever objects may be within the FOV of the image sensor 320, and may then operate the image sensor 320 to capture one or more images of whatever objects may be within the FOV while so illuminated, before operating the scanning light source 380 to cease to emit light and the image sensor 320 to cease to capture images.

In differing embodiments, it may be either the scanning engine 300 or the controller 500 that performs the decoding of the indicia 775 following a successful capture of an image of the indicia 775 by the image sensor 320 of the scanning engine 300. In embodiments in which it is the scanning engine 300 that decodes the indicia 775 from a successfully captured image thereof, the scanning engine 300 may convey the data decoded by the scanning engine 300 to the controller 500 to be relayed by the controller 500 to a server or other device (not shown). In embodiments in which it is the controller 500 that decodes the indicia 775 from a successfully captured image thereof, the scanning engine 300 may convey image data that represents such a captured image of the indicia 775 to the controller 500 to be decoded thereby.

The controller 500 may include any of a wide variety of processors, microcontrollers, gate-array logic devices, etc. that may incorporate any of a variety of features to enhance speed and/or efficiency of processing operations. Such features may include and are not limited to, multi-threading support, multiple processing cores, single-instruction multiple-data (SIMD) support, directly integrated memory control functionality, and/or various modes of operation by which speed of throughput and/or level of power consumption may be dynamically altered. In various embodiments, logic on which operation of the controller 500 may be based may be embodied in hardware, software, electrical circuitry, firmware embedded within the controller 500 or on flash read only memory (ROM), on an application specific integrated circuit (ASIC), or any combination thereof.

The image sensor 320 and scanning light source 380 are supported within the hollowing interior of the scanning head 101 by being carried on a support structure 200 that may be mounted to and/or otherwise supported within an interior portion of the casing of the scanning head 101. The support structure 200 may form a substantially rectangular housing in which at least the scanning engine 300 may be protectively carried to shield at least the scanning engine 300 from physical shocks arising from instances of the scanning device 100 being dropped and/or subjected to other physical impacts. As can be more clearly seen in FIGS. 3, 4 and 5, such a rectangular housing of the support structure 200 may define a top surface 211, at least one side surface 215, and a rear surface 214. The form factor of the housing for the support structure 200 is a matter of design choice. As depicted in FIGS. 3, 4, 5, support structure 200 is further provided with a plurality of ribs 220 to provide strength to the support structure and to receive and hold an optical hardware system of this disclosure as explained below.

The support structure 200 may include a scanning window 250, which like the scanning window 150, may be formed of transparent material. The support structure 200 may be positioned within the hollow interior region of the scanning head 101 to align the scanning window 250 of the support structure 200 with the scanning window 150 of the casing of the scanning head 101. As a result, the central scanning axis 372 and the central illumination axis 387 may both extend from the scanning engine 300, and through both scanning windows 250 and 150 as the central scanning axis 372 and the central illumination axis 387 extend forward of the front end 113 of the scanning head 101. Thus, when the scanning device 100 is correctly aimed at the indicia 775 to scan the indicia 775, the light emitted by the scanning light source 380 is projected along the central illumination axis 387 through the scanning windows 250, and then 150, and onto the indicia 775 to illuminate the indicia 775 in preparation for capturing the indicia. Correspondingly, reflected light of the indicia 775 may proceed along the central scanning axis 372 through the scanning windows 150, and then 250, and toward the image sensor 320 to be captured thereby.

Also supported by the support structure 200 may be a combination of a light pipe 450 and a light source 480 that may be selectively operated by the controller 500 to cooperate with the light pipe 450 to project a green dot or other visual indication to success in capturing and decoding the indicia 775. More specifically, after the controller 500 has operated the scanning light source 380 and the image sensor 320 to capture one or more images of whatever objects may be within the FOV of the image sensor 320, and after an attempt has been made to decode the indicia 775 from within the one or more captured images 775, the controller 500 may determine whether or not both a successful capture and a successful decode of the indicia 775 was achieved.

The manner in which the controller 500 makes such a determination may be based on whether any data was successfully decoded from the indicia 775. If not, then it could be due to a lack of capturing an image of the indicia 775. It may be that the scanning device 100 was not correctly aimed at the indicia 775 such that no part of the indicia 775 or not enough of the indicia 775 was within the FOV of the image sensor 320 to enable a successful capture. However, even if the indicia 775 captured in at least one image by the image sensor 320, it may be that something prevent a successful decode of the indicia 775, such as the indicia 775 being out of focus due to the scanning device 100 being positioned too close to or too far from the indicia 775. Alternatively, it may be that the indicia 775 employs a form of encoding of data that the scanning engine 300 or the controller 500 is not capable of decoding. Regardless of the reason for the lack of success in capturing and/or decoding the indicia 775, the controller 500 may respond by refraining from operating the light source 480 to project a green dot or other visual indicator of successful capture and decoding.

However, if the controller 500 makes a determination that data was successfully decoded from at least one captured image, then such a determination may include the presumption that there was a successful capture of the indicia 775, since otherwise, there could not be a successful decode thereof. The controller 500 may then respond to such a determination by proceeding to operate the light source 480 to project a green dot or other visual indicator of successful capture and decoding.

The light source 480 may be any of a variety of types of light source suitable for producing a visual indicator on the surface 770 of the object 700 such that is bright enough and is within the visible spectrum of human eyesight such that a user of the scanning device 100 is able to see it. Illustratively, light source 480 may be a LED or a set of LEDs, such as for example, the LEDs model HLMP-CM15 supplied by Hewlett Packard, Palo Alto, Calif. (USA), with an epoxy resin package having a diameter of 5 mm, peak wavelength of lambda=524 nm and emission angle of 15 degree, or the LEDs model LT5413 by OSRAM, Munich, Germany, having a peak wavelength lambda=525 nm and package and emission angle equal to the LEDs of the previous type. Both of these specific examples of LEDs emit a green light, which may be deemed desirable as the color of green is widely recognized as a color used to provide a positive indication. The use of green as an indicator of successful scan and decode may also be advantageous insofar as it may be visually distinct from the light emitted by the scanning light source 380. As will be familiar to those skilled in the art, a typical choice of color of light for illuminating a barcode or other indicia is red, and a green dot projected by the combination of the light source 480 and the light pipe 450 may provide a visual indicator that contrasts sharply enough with such illumination of the indicia as to be quickly recognizable.

Alternatively, the light source 480 may be capable of being operated to emit light of a selectable color. More specifically, the light source 480 may be a single multi-colored LED or a multi-chip set of LEDs that includes two or more LED chips that each emit light of a different color. Each such LED chip could be operated individually to emit its own color or combinations of two or more of such LED chips could be operated in various ratios of intensity to generate any of a variety of colors. Examples of such multi-chip sets of LEDs include the red and green dual-chip LED LU 5351-JM commercially available from OSRAM, or RGB LEDs such as the LEDs KAA-3528EMBSGC from Kingbright. The latter specific example product includes three chips emitting in the three primary colors (red, green and blue) independently drivable to obtain the complete range of colors perceptible by human eyes. In this way, the different colors can be used to give specific result indications to the operator.

Where the light source 480 is implemented with a multi-color LED (or set of LEDs) or with some other form of multi-color lighting device, the controller 500 may operate the light source 480 to cooperate with the light pipe 450 to emit visual indications with different colors at different times and/or to indicate different statuses. By way of example the controller 500 may be configured to operate the light source 480 to emit a first color of more than one predetermined colors to provide a visual indication of success in capturing and decoding the indicia 775 (e.g., a green color), and to emit a second color of the more than one predetermined colors to provide a visual indication of failure in capturing and decoding the indicia 775 (e.g., a red color). The controller 500 may also be configured to operate the light source 480 to emit a third color of the more than one predetermined colors to provide a third indicator that may be used by the operator as a guide in aiming the scanning device 100 toward the indicia 775 in embodiments in which the scanning light source 380 does not emit light with a pattern and/or with a humanly perceivable color that would provide such a visual guide for aiming.

As depicted in FIG. 1, in some embodiments, the light source 480 may be positioned either alongside the support structure 200 at a location adjacent to a side surface 215 thereof. In such embodiments, and as will be explained in greater detail, much of the light pipe 450 may be supported by the support structure 200 to extend flush with and alongside that side surface 215. In other embodiments, the light source 480 may be positioned to the rear of the support structure 200 at a location adjacent to the rear surface 214 thereof. In such other embodiments, and as will also be explained in greater detail, much of the light pipe 450 may again be supported by the support structure 200 to extend flush with and alongside a side surface 215 with another portion of the light pipe 450 reaching around and partly alongside the rear surface 214 towards the location of the light source 480.

Regardless of whether the light source 480 is positioned alongside or to the rear of the support structure 200, as will be explained in greater detail, the support structure 200 may incorporate a holder 245 to physically support the light source 480. Also, at least where the light source 480 does not, itself, emit collimated light, the support structure 200 may provide a diaphragm 225 that defines an aperture 226 through which at least a portion of the light emitted by the light source 480 may pass on the way to the light pipe 450, thereby becoming collimated to at least some degree in so doing. As will be familiar to those skilled in the art, such a diaphragm may also be referred to as a stop due to its function of stopping the passage of light, except for the light that passes through its aperture.

In embodiments in which the visual indicator of successful capture and decoding of the indicia 775 is to be a green dot (or a dot of some other color), the aperture 226 may be defined by the diaphragm 225 to have a round shape to give the resulting projected light a round dot shape. However, in other embodiments, the aperture 226 may be defined to have any of a variety of simple or complex shapes. The shape is a matter of design choice.

The light pipe 450 is a light conduit made of a transparent material, such as glass or plastic, which is capable of channeling light from an inlet end 414 thereof to an outlet end 413 thereof through successive internal reflections. It should be noted that the transparent materials from which the light pipe 450, and each of the scanning windows 150 and 250 may be made may be similar or different transparent materials.

We now turn to details of the configuration of optical hardware 469 in a way that makes more efficient use of space in tightly designed scanning device. Before turning to that disclosure, however, a few additional words about FIG. 1 are helpful. First, and as previously explained, the components and functions depicted in each of FIGS. 1A and 1B are the same. The difference between the two figures lies in the spatial orientation of the components of optical hardware 469 with respect to the scanning head 101 of the scanning device 100. More specifically, in FIG. 1A, the LED 480, the diaphragm 225, and the light pipe 450 of the optical hardware 469 are essentially collinearly disposed along the top surface 211 or a side surface 215 of the support structure 200 in the scanning head 101 of the scanning device 100. In FIG. 1B, these components are distributed about the support structure 200. In particular, the light pipe 450 is disposed primarily along the top surface 211 or a side surface 215 of the support structure 200 while the light source 480 and the diaphragm 225 are disposed along the rear surface 214 of the support structure 200. The arrangement of these components in a tight design according to the teachings of this disclosure as explained below make for more efficient use of the typically limited space within the scanning head 101 of a handheld scanning device 100.

Regardless of whether the light pipe 450 is supported to extend alongside the top surface 211 or a side surface 215 of the support structure, the top surface 211 or the side surface 215 may be provided by a wall of the generally rectangular shape of the support structure 200. Such a wall may extend between and separate the light pipe 450 and the scanning engine 300, and may provide a planar portion of the support structure 200 to which both of the light pipe 450 and the scanning engine 300 may be mounted or affixed in any of a variety of ways to be supported by that planar portion.

Figure 2A:
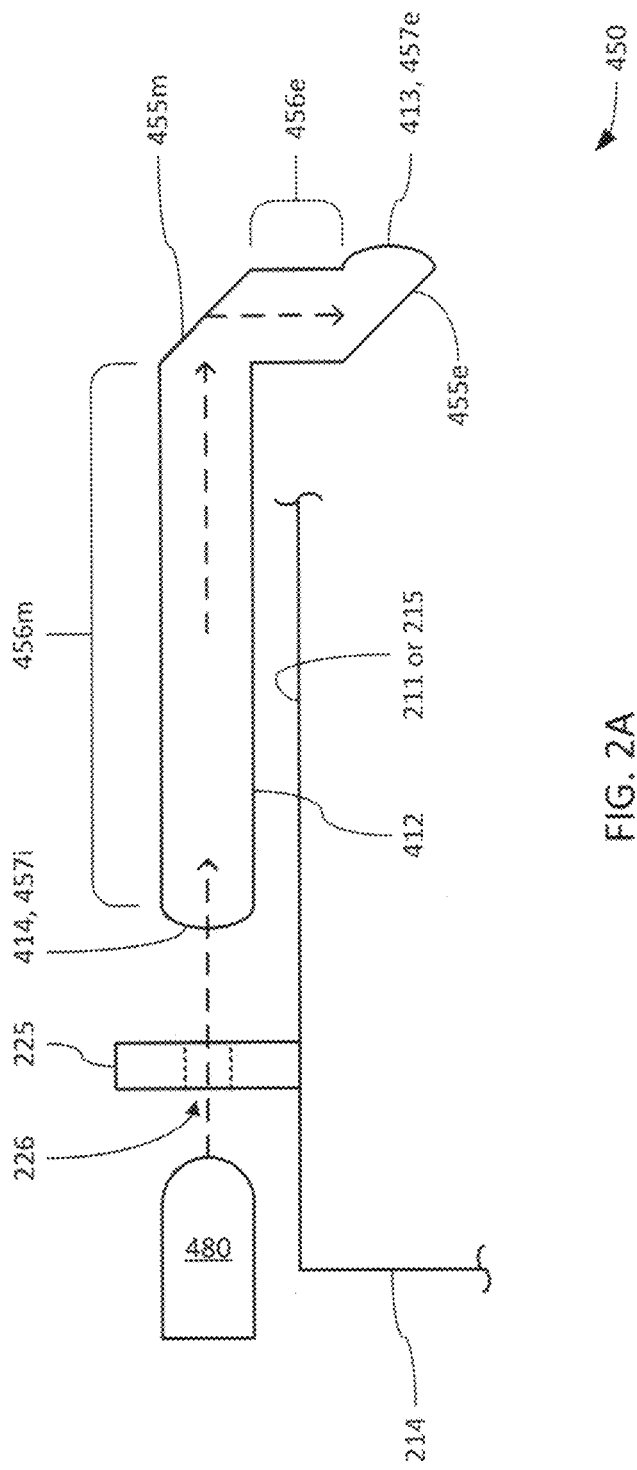
FIGS. 2A and 2B, collectively referred to herein as FIG. 2, show aspects of optical components of each of the first illustrative embodiment and the second illustrative embodiment, respectively, of FIG. 1 according to this disclosure.
Figure 2B:
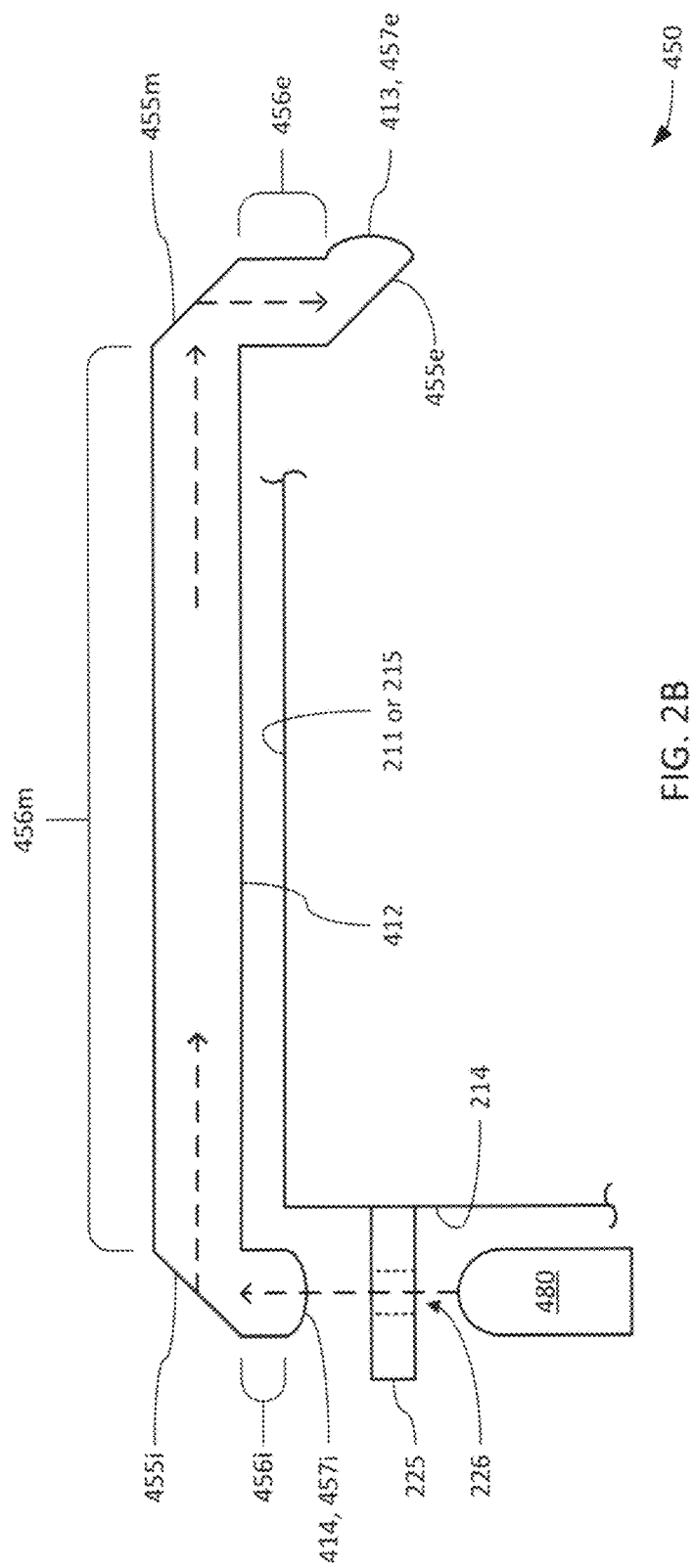

FIGS. 2A and 2B, collectively referred to herein as FIG. 2, show elevational views of aspects of optical components of the first illustrative embodiment and the second illustrative embodiment of FIG. 1 according to this disclosure. More specifically, FIG. 2 depicts aspects of the light pipe 450, as well as aspects of the positioning and alignment of the light source 480, the diaphragm 225 and the light pipe 450.

Turning more specifically to FIG. 2A, in embodiments in which the light source 480 is positioned alongside the support structure 200 (e.g., alongside either the top surface 211 or a side surface 215 thereof), the light pipe 450 may have a generally "dog-leg" configuration in which the light pipe 450 includes two straight lengths 456m and 456e, and two bends 455m and 455e between its inlet end 414 and its outlet end 413. The inlet end 414 may be positioned at one end of the middle length 456m, and the other end of the middle length 456m may join an end of the outlet length 456e at an angle at the bend 455m. The other end of the outlet length 456e may join with the outlet end 413 of the light pipe 450 at an angle at the bend 455e. Thus, light from the light source 480 may enter into the light pipe 450 at the inlet end 414, and may be conveyed through the middle length 456m to the bend 455m where that light is reflected by a reflecting surface of the bend 455m from the middle length 456m and into the outlet length 456e. That reflected light may be conveyed through the outlet length 456e to the bend 455e where that light is reflected by a reflecting surface of the bend 455e from the outlet length 456e and out of the light pipe 450 through the outlet 413.

Turning more specifically to FIG. 2B, in embodiments in which the light source 480 is positioned to the rear of the support structure 200 (e.g., adjacent to the rear surface 214 thereof), the light pipe 450 may have a somewhat more complex shape that may be a superset of the configuration depicted in FIG. 2A in which the light pipe 450 may additionally include a third straight length 456i and a third bend 455i between its inlet end 414 and its outlet end 413. In this more complex configuration, the inlet end 414 may be positioned at one end of the inlet length 456i, and the other end of the inlet length 456i may join an end of the middle length 456m at an angle at the bend 455i. The rest of the light pipe 450 of FIG. 2B may be substantially similar to the light pipe 450 of FIG. 2A in which the other end of the middle length 456m may join with an end of the outlet length 456e at an angle at the bend 455m, and the other end of the outlet length 456e may join with the outlet end 413 of the light pipe 450 at an angle at the bend 455e. Thus, light from the light source 480 may enter into the light pipe 450 at the inlet end 414, and may be conveyed through the inlet length 456i to the bend 455i where that light is reflected by a reflecting surface of the bend 455i from the inlet length 456i and into the middle length 456m. The reflected light may be conveyed through the middle length 456m and to the bend 455m where that light is reflected by a reflecting surface of the bend 455m from the middle length 456m and into the length 456e. That twice reflected light may be conveyed through the outlet length 456e to the bend 455e where that light is reflected by a reflecting surface of the bend 455e from the length 456e and out of the light pipe 450 through the outlet 413.

Referring now to both FIGS. 2A and 2B, in both configurations of the light pipe 450, each of the angles at which lengths 456i, 456m and/or 456e of the light pipe meet at bends 455i, 455m and/or 455e may be right angles. However, other embodiments are possible in which different angles may be used. Also, the reflective surfaces at each of the bends 455i, 455m and/or 455e may or may not have a reflective coating applied thereto to enhance their reflectivity in various embodiments.

Referring to FIG. 1 in addition to FIG. 2, in both configurations of the light pipe 450, the an external surface 412 of the middle length 456m extends alongside and flush against a planar surface provided by either the top surface 211 or a side surface 215 of the support structure 200. Also, in both configurations, the outlet end 456e is caused to extend from the bend 455m and through the planar surface provided by either the top surface 211 or a side surface 215, and into the substantially rectangular space defined by the support structure 200 within which at least the scanning engine 300 may be supported.

As previously mentioned, in embodiments in which the light source 480 does not, itself, emit collimated light, the support structure 200 may provide the diaphragm 225 defining the aperture 226 through which light emitted by the light source 480 may pass to impart some degree of collimation to such light. Alternatively or additionally, the inlet end 414 of the light pipe 450 may incorporate an inlet lens 457i to also impart some degree of collimation to the light received thereat from the light source 480. In embodiments in which the light source 480 does emit collimated light, neither of the diaphragm 225 nor the inlet lens 457i may be needed, and the inlet end 414 of the light pipe may be provided with a flat surface through which such collimated light emitted by the light source 480 may enter the light pipe 450.

Regardless of whether the light source 480 emits collimated light, and regardless of whether the either of the diaphragm 225 or the inlet lens 457i are provided to impart some degree of collimation to the light emitted by the light source 480, the outlet end 413 of the light pipe 450 may incorporate an outlet lens 457e to impart a selected degree of spread to the light that is projected therefrom and along the central projection axis 487. It should be noted that such a degree of spread as may be imparted to the light projected from the outlet end 413 may be relatively limited in comparison to the degrees of spread associated with the light emitted by the scanning light source 380, since the light emitted by the scanning light source 380 may be intended to illuminate the entirety of the indicia 775, while the light projected from the outlet end 413 of the light pipe 450 may be intended to project a visual indicator that may be of considerably smaller size as projected on the surface 770 of the object 700 than the indicia 775.

In some embodiments, the central projection axis 487 may be positioned and/or oriented to extend in parallel with one or both of the central illumination axis 387 and the central scanning axis 372. In some embodiments, it may be intended that the visual indicator provided by the projection of light from the outlet end 413 of the light pipe 450 is to appear on the surface 770 of the object at a location adjacent to or overlying the indicia 775 in order to be conveniently placed where the user of the scanning device 100 may be instinctively already looking as they operate the scanning device 100 to scan the indicia 775. The earlier described extending of the outlet length 456e into the portion of the support structure 200 that encloses and supports the scanning engine 300 may be intended to position the bend 455e and the outlet end 413 (with or without the outlet lens 457e)

in front of the scanning engine 300 at a location that puts the central projection axis 487 at the needed position and orientation relative to one or both of the central illumination axis 387 and the central scanning axis 372. As a result of such positioning of the outlet end 413, the light projected from the outlet end 413 may be caused to be projected through both of the scanning windows 250 and 150 along with the light emitted by the scanning light source 380.

Figure 3A:
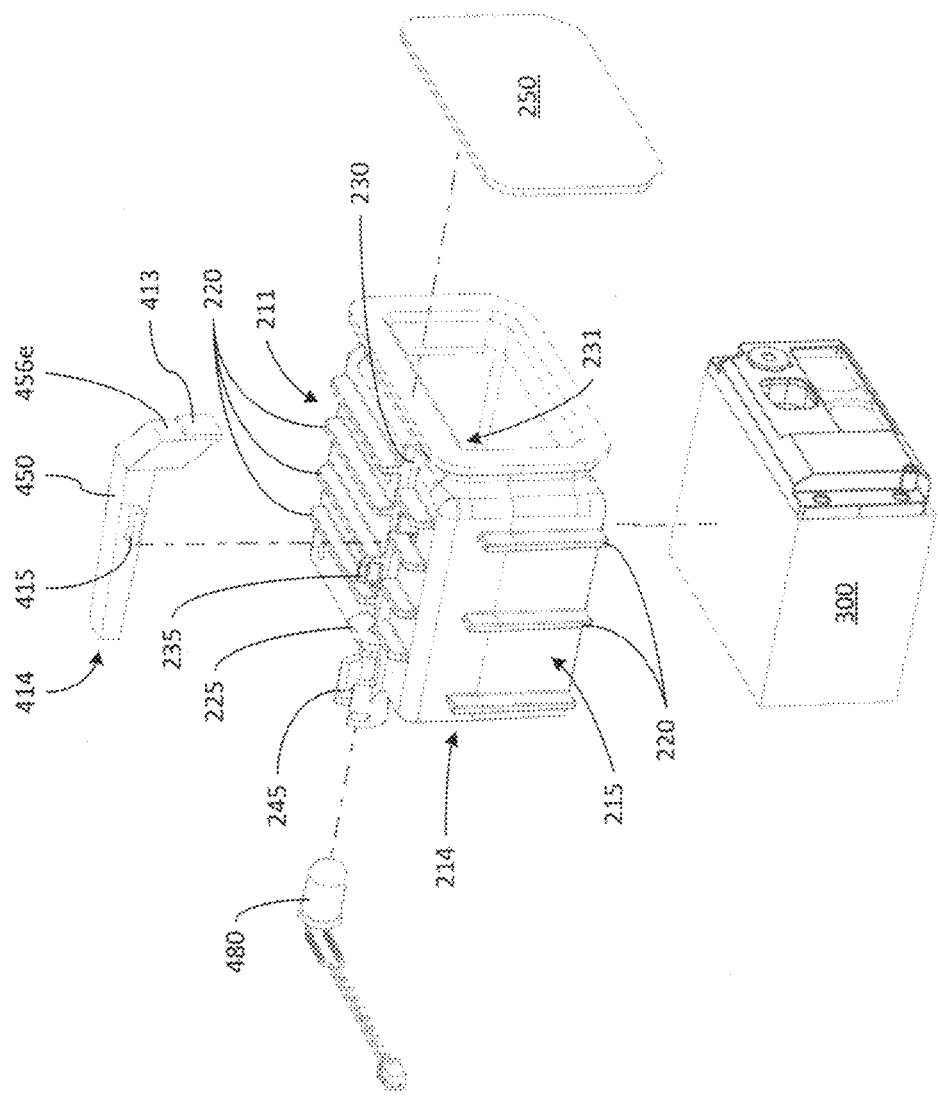
FIGS. 3A and 3B, collectively referred to herein as FIG. 3, show aspects of an exploded disassembled view and assembled view, respectively, of the system for an optical assembly for a scanning engine depicted in FIG. 1A according to this disclosure.
Figure 3B:
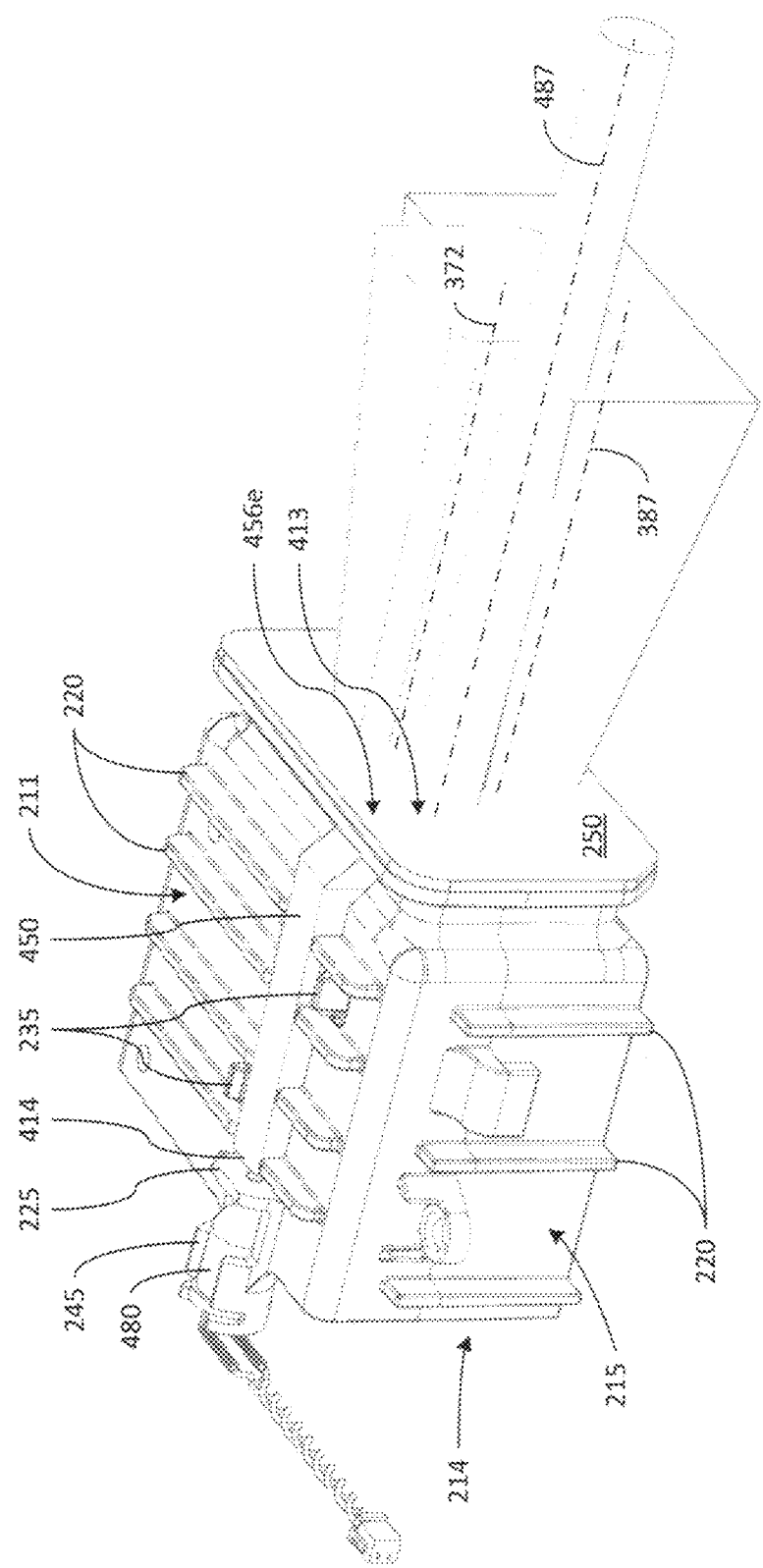

FIGS. 3A and 3B, collectively referred to herein as FIG. 3, show aspects of an exploded disassembled view and assembled view, respectively, of the system for an optical assembly for a scanning engine depicted in FIG. 1A according to this disclosure. More specifically, FIG. 3 depicts an embodiment in which the middle length 456m of the light pipe 450 extends along, and with the external surface 412 flush against, the top surface 211. As depicted, multiple ribs 220 of elongate shape may be formed integrally with and may extend away from planar surfaces defined by each of the top surface 211 and the depicted side surface 215 of the support structure 300. The multiple ribs 220 may be so formed with the top surface 211 and the depicted side surface 215 of the support structure to strengthen each of the planar portions of the support structure 200 that define the top surface 211 and the depicted side surface 215.

To accommodate and further support at least the middle length 456m of the light pipe 450 in its location alongside the top surface 211, the multiple ribs 200 extending from the top surface 211 may each be formed to define a gap through which the middle length 456m extends. Each of such gaps may be shaped and sized to cause portions of each such rib 220 to fit closely against opposing sides of the middle length 456.

To also support at least the middle length 456m of the light pipe 450 in its location alongside the top surface 211, a trough 230 may be defined in the top surface 211 into which the middle length 456m may be slightly inset. Alternatively or additionally, to also support at least the middle length 456m of the light pipe 450 in its location alongside the top surface 211, the middle length 456m may carry one or more mounting tabs 415 that may extend from opposed sides of the middle length 456m and into spaces in between pairs of adjacent ribs 220 at which may be located mounting clips 235 to engage the one or more mounting tabs 415.

As previously discussed, and as depicted in FIG. 3, with the middle length 456m of the light pipe 450 extending alongside the top surface 211, and with the light source 480 also positioned alongside a portion of the top surface 211, the support structure 200 may provide the holder 245 at a location formed integrally with the planar portion of the support structure 200 that defines the top surface 211. As also previously discussed, with the holder 245 so positioned, and at least in embodiments in which the light source 480 does not emit collimated light, the top surface 211 may carry the diaphragm 225 at a position interposed between the holder 245 and the inlet end 414 of the light pipe 450, and also formed integrally with the planar portion of the support structure 200 that defines the top surface 211.

As previously discussed, and as depicted in FIG. 3, the outlet end 456e of the light pipe 450 may extend through an opening 231 defined through the top surface 211 and into the location within the rectangular volume defined by the support structure 200 within which the scanning engine 300 is supported. As also depicted in FIG. 3, the opening 231 may join with the trough 230 formed in the top surface 211.

Figure 4A:
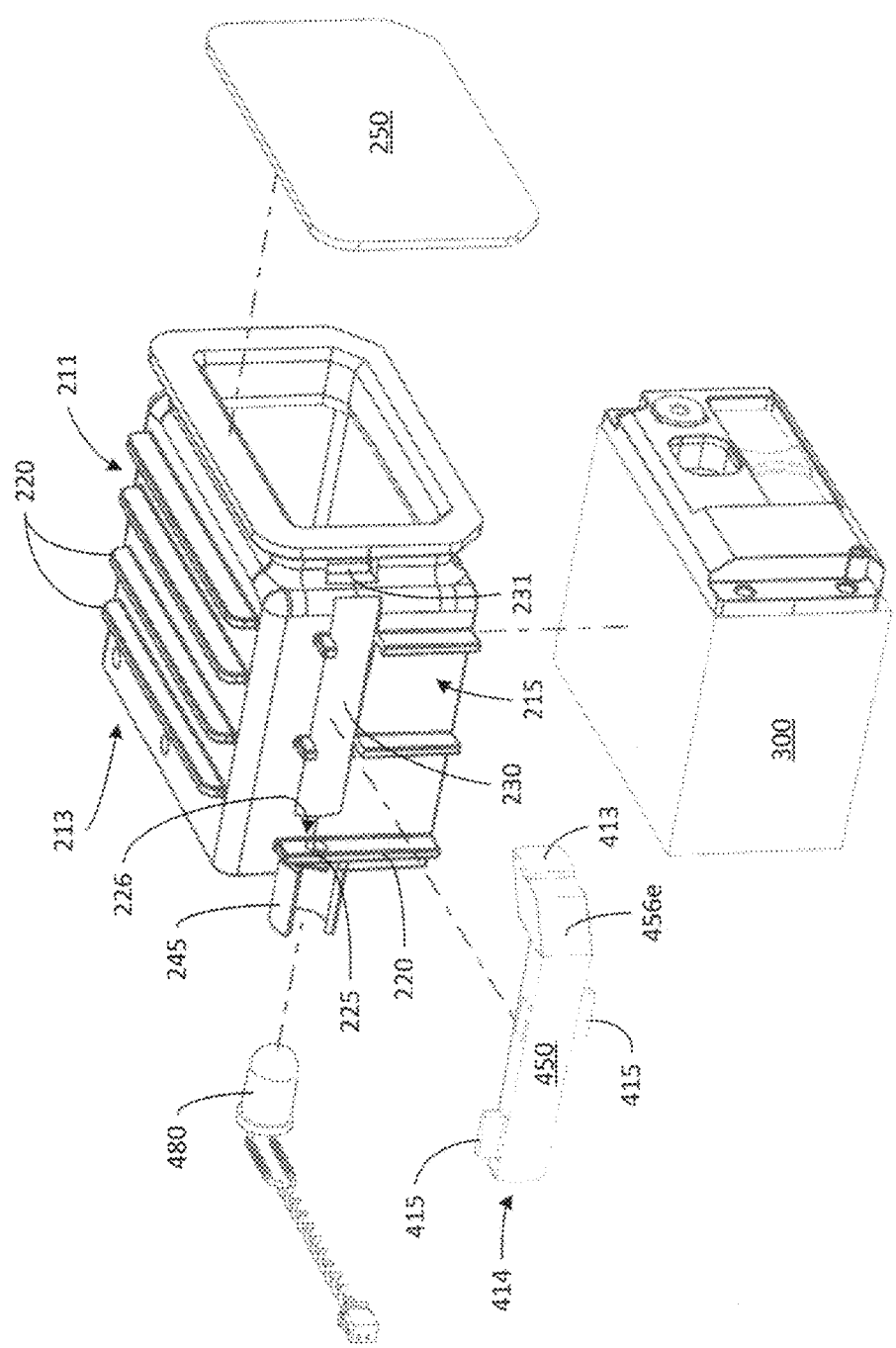
FIGS. 4A and 4B, collectively referred to herein as FIG. 4, show aspects of an exploded disassembled view and assembled view, respectively, of another embodiment of the system for an optical assembly for a scanning engine depicted in FIG. 1A according to this disclosure.
Figure 4B:
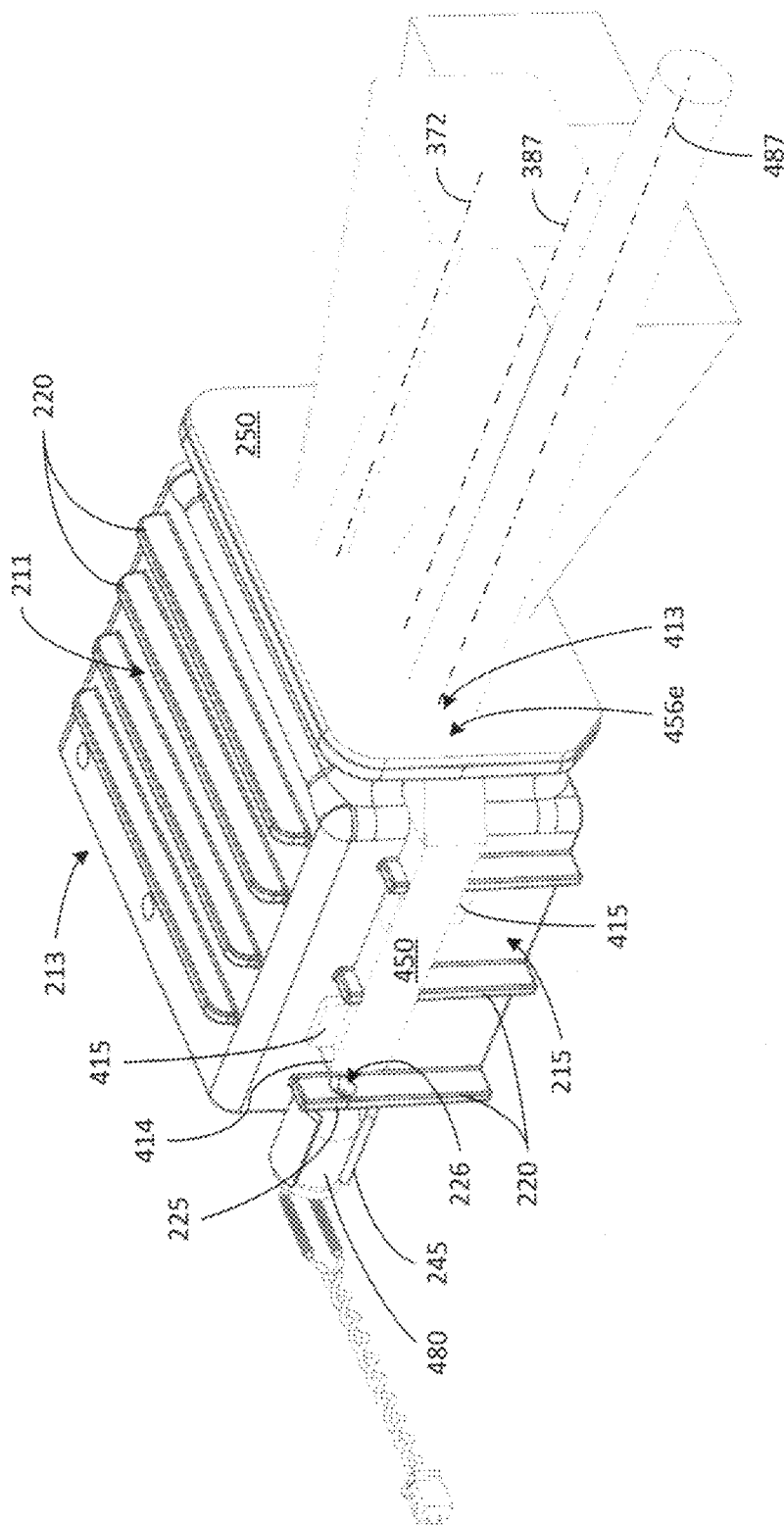
Figure 5:
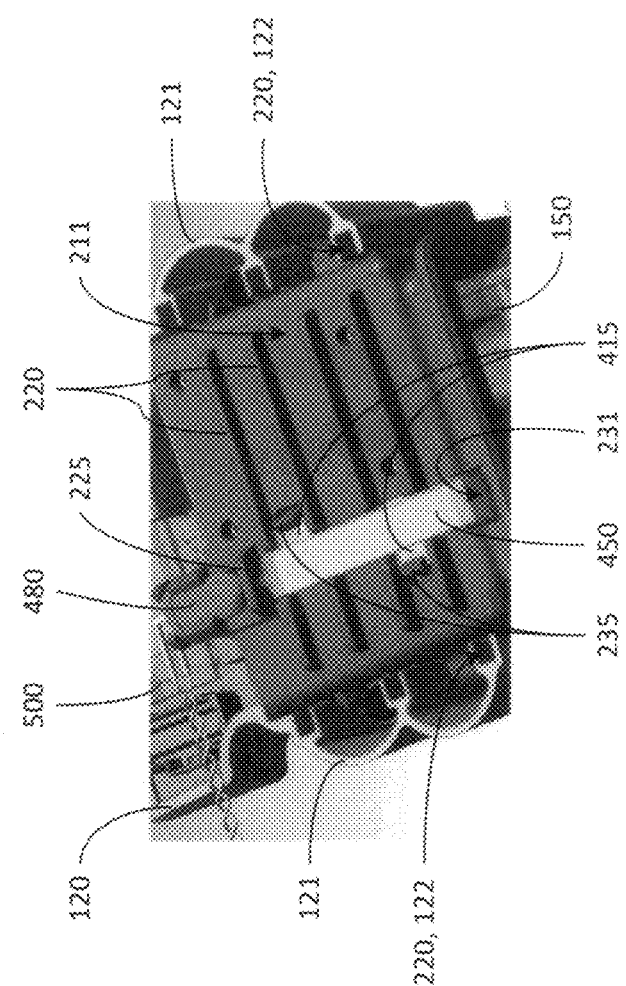
FIG. 5 shows aspects of an illustrative embodiment of the system for an optical assembly for a scanning engine depicted in FIG. 3 cradled within a handheld scanning device according to this disclosure.

FIGS. 4A and 4B, collectively referred to herein as FIG. 4, show aspects of an exploded disassembled view and assembled view, respectively, of the system for another optical assembly for a scanning engine depicted in FIG. 1A according to this disclosure. Numerous similarities may exist between the embodiments depicted in FIG. 3 and in FIG. 4, with a primary difference therebetween being that the FIG. 3 depicts the light pipe 450 as extending over the top of the support structure 200, while FIG. 4 depicts the light pipe 450 as extending around a side of the support structure 200.

More specifically, FIG. 4 depicts an embodiment in which the middle length 456m of the light pipe 450 extends along, and with the external surface 412 flush against, a side surface 215. Again, multiple ribs 220 of elongate shape may be formed integrally with and may extend away from planar surfaces defined by each of the top surface 211 and the depicted side surface 215 of the support structure 300. And again the multiple ribs 220 may be so formed with the top surface 211 and the depicted side surface 215 of the support structure to strengthen each of the planar portions of the support structure 200 that define the top surface 211 and the depicted side surface 215.

To accommodate and further support at least the middle length 456m of the light pipe 450 in its location alongside the depicted side surface 215, the multiple ribs 200 extending from the depicted side surface 215 may each be formed to define a gap through which the middle length 456m extends. Again, each of such gaps may be shaped and sized to cause portions of each such rib 220 to fit closely against opposing sides of the middle length 456.

To also support at least the middle length 456m of the light pipe 450 in its location alongside the depicted side surface 215, a trough 230 may be defined in the depicted side surface 215 into which the middle length 456m may be slightly inset. Alternatively or additionally, to also support at least the middle length 456m of the light pipe 450 in its location alongside the depicted side surface 215, the middle length 456m may carry one or more mounting tabs 415 that may extend from opposed sides of the middle length 456m and into spaces in between pairs of adjacent ribs 220 at which may be located mounting clips 235 to engage the one or more mounting tabs 415.

As previously discussed, and as depicted in FIG. 4, with the middle length 456m of the light pipe 450 extending alongside the depicted side surface 215, and with the light source 480 also positioned alongside a portion of the depicted side surface 215, the support structure 200 may provide the holder 245 at a location formed integrally with the planar portion of the support structure 200 that defines the depicted side surface 215. As also previously discussed, with the holder 245 so positioned, and at least in embodiments in which the light source 480 does not emit collimated light, the depicted side surface 215 may carry the diaphragm 225 at a position interposed between the holder 245 and the inlet end 414 of the light pipe 450, and also formed integrally with the planar portion of the support structure 200 that defines the depicted side surface 215. However, unlike the diaphragm 225 depicted in FIG. 3, the diaphragm 225 depicted in FIG. 4 is formed integrally with (i.e., is incorporated into) one of the ribs 220.

As previously discussed, and as depicted in FIG. 4, the outlet end 456e of the light pipe 450 may extend through an opening 231 defined through the depicted side surface 215 and into the location within the rectangular volume defined by the support structure 200 within which the scanning engine 300 is supported. As also depicted in FIG. 4, the opening 231 may join with the trough 230 formed in the depicted side surface 215.

FIG. 5 shows aspects of an illustrative embodiment of the system for an optical assembly for a scanner engine depicted in FIG. 3 cradled within a handheld scanning device according to this disclosure. FIG. 3 again is the illustrative embodiment of this disclosure wherein a gap is illustratively provided in a plurality of the ribs 220 along the top surface 211 of the support structure 200.

FIG. 5 depicts the support structure 200 as received within a casing structure 120 within the hollow interior region of the scanning head 101. Multiple ones of the ribs 220 formed integrally with opposed side surfaces 215 of the support structure 200 are received and engaged within engagement slots 122 of the casing structure 120. Additionally, the casing structure 120 may incorporate multiple cushioning support rounds 121 to brace the casing structure 120 against internal surfaces of the casing of the scanner head 101 in a manner that absorbs kinetic energy to cushion the support structure 200 against physical shocks resulting from instances in which the scanning device 100 may be dropped onto hard surface and/or may otherwise be subjected to physical impacts. By so doing, the scanning engine, the controller 500, the light pipe 450 and/or the light source 480 are accordingly cushioned against such physical shocks.

Turning now to the operation of the system 1000 of this disclosure and with reference back to FIG. 1, a processor 550 of the controller 500 may access a memory unit 560 of the controller 500 to retrieve and/or execute a control routine 540 to control various aspects of the operation of the system 1000. In so doing, the controller 500 may be caused to monitor various aspects of the system 1000 and/or of others of the components of the system 1000 such as the scanning engine 300, the power source 510 and/or the trigger switch 520.

By way of example, the controller 500 may be caused by its execution of the control routine 540 to await an indication of a manual operation of the trigger switch 520, thereby serving to provide a manually entered command to capture an image of and decode the indicia 775. In response, the controller 500 may be caused to operate the scanning light source 380 to illuminate the indicia 775 and to operate the image sensor 320 to capture an image of the indicia 775.

Such detection of manual operation of the trigger switch 520 may also trigger the performance of decoding of the indicia 775, as captured, by the controller 500 or by the scanning engine 300 in various different embodiments. In the performance of such decoding, any of a variety of algorithms may be employed to analyze captured images to locate the indicia 775 therein, and/or to decode the indicia 775 to derive therefrom the data that is encoded therein. The processor 550 may be caused to store the decoded data within the memory unit 560 for being transmitted from the scanning device 100 and to a server or other device (not shown) through use of a transceiver 590 of the controller 500.

As previously discussed, the controller 500 may be coupled to the scanning engine 300 (including the image sensor 320 and the scanning light source 380), and may be configured to: operate the scanning engine 300 to scan the indicia 775 along the central scanning axis 372; interpret the indicia 775 to decode data that is encoded within the indicia 775; and in response to a successful capture and decoding of the indicia 775, operate the light source 480 to emit light into the inlet end 414 of the light pipe 450 to cause the projection of light from the outlet end 413 of the light pipe along the central projection axis 487 and onto the surface 770 of the object 700 that carries the indicia 775 to provide a first visual indicator of success in scanning and interpretation of the indicia 775.

The light source 480 may include a multi-color LED configured to emit more than one predetermined color. The processor may be configured to operate the multi-color LED to emit a first color of the more than one predetermined colors to provide the first visual indicator. The processor may be configured to operate the multi-color LED to emit a second color of the more than one predetermined colors to provide a second visual indicator of failure in at least one of scanning and interpretation of the indicia.

The processor may be configured to operate the multi-color LED to emit a third color of the more than one predetermined colors to provide a third indicator of success in scanning and interpretation of multiple indicia carried on the surface.

The processor may be configured to operate the multi-color LED to emit a third color of the more than one predetermined colors to provide a third indicator to guide an operator of the scanning device in aiming the scanning device at the surface that carries the indicia.

The controller 500 may determine whether the capture and decoding of the indicia 775 are successful, and if successful the controller 500 may operate the light source 480 to project a green dot (or other visual indicator) of success in scanning as explained in FIG. 6 below.

Figure 6:
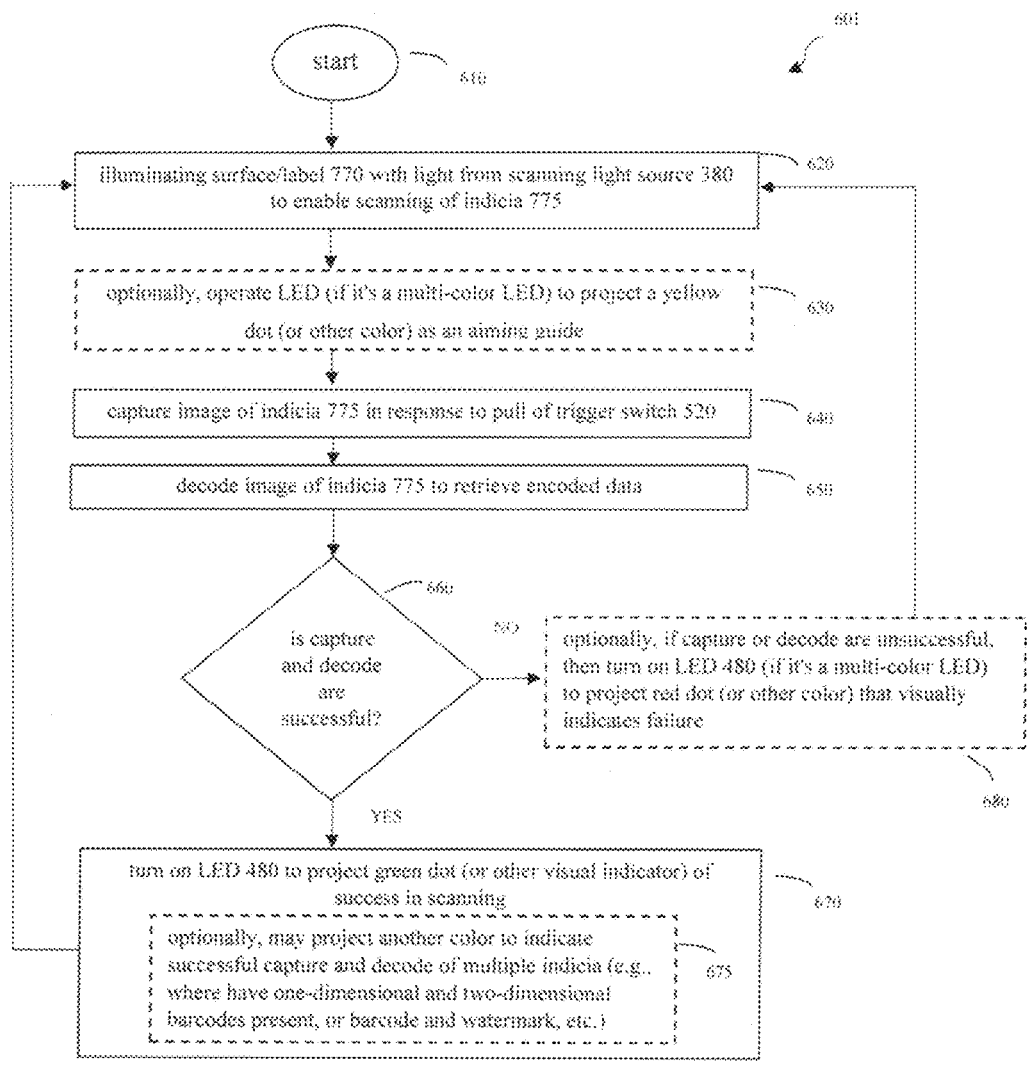
FIG. 6 shows an illustrative flow chart depicting aspects of an illustrative operation of an embodiment of the system 1000 for an optical assembly for a scanning engine according to this disclosure.

FIG. 6 shows an illustrative flow chart depicting aspects of an illustrative operation of an embodiment of the system 1000 for an optical assembly for a scanning engine according to this disclosure. More specifically, FIG. 6, with reference also to FIG. 1, depicts aspects of operations performed by the processor 550 of the controller 500 of the scanning head 101 of a handheld scanning device under the control of instructions of the control routine 540 stored in the memory unit 560 of the controller 500.

At 620, light from scanning light source 380 illuminates surface/label 770 of object 700 to enable scanning of indicia 775.

Optionally, at 630, an LED (if it's a multi-color LED) is operated to project a yellow dot (or other color) as an aiming guide.

At 640, an image sensor of a camera of a decoding system 1000 (e.g., the image sensor 320 of one of the cameras incorporated in the scanning head 101 of the handheld scanning device 100) captures an image of an object within its field of view (FOV) (e.g., an image of the object 700 within the FOV). The image is captured in response to activation of trigger switch 520 by the user manually operating the trigger switch 520 incorporated into the handle 102 of the handheld scanning device 100.

At 650, the controller 500 decodes the image of indicia 775 to retrieve encoded data.

At 660, the controller 500 makes a determination whether or not the capture and decode are successful. If, at 660, the determination is that the capture and decode are successful, at step 670, the controller 500 operates LED 480 to project a green dot (or other visual indicator) of success in scanning. More specifically, the controller 500 causes LED 480 to cooperate with the light pipe 450 to generate and project a beam of light which the user may see reflected off the code indicia as a "green dot". When the user sees the "green dot" the user knows that the particular aimed-at indicia 775 has been successfully captured and decoded by the scanning device 100 (e.g., a form of "good-read" feedback to the user). The visual feedback provided by the "green spot"

enhances good code read even where silent reading is preferred or in environments that are too noisy to hear the beep.

The controller 500 then returns to step 620 to cause light from scanning light source 380 to illuminate surface/label 770 to enable another scanning of indicia 775.

Optionally, if at step 660 the controller 500 makes a determination that the capture and decode are successful, the controller 500 may optionally determine whether the capture and decode was of multiple indicia (e.g., where have one-dimensional and two-dimensional barcodes present, or barcode and watermark, etc.). If the controller 500 determines the capture and decode was not of multiple indicia, the controller 500 may advance to step 670 to operate LED 480 to project green dot (or other visual indicator) of success in scanning. If, however, the controller 500 determines the capture and decode was of multiple indicia, the controller may advance to step 675 and project another color to indicate successful capture and decode of multiple indicia (e.g., where have one-dimensional and two-dimensional barcodes present, or barcode and watermark, etc.) as depicted in step 675. The controller 500 then returns to step 620 to cause light from scanning light source 380 to illuminate surface/label 770 to enable another scanning of indicia 775.

If at 660, the controller 660 makes a determination that the capture and decode are not successful, the controller 500 returns to step 620 where it causes light from scanning light source 380 to illuminate surface/label 770 to enable another scanning of indicia 775.

Optionally, if at 660 the controller 660 makes a determination that the capture and decode are not successful, then before returning to step 620, the controller 600 may turn on LED 480 (if it's a multi-color LED) to project red dot (or other color) that visually indicates failure.

There is thus disclosed for a handheld scanning device a support frame configured to physically support an indicia scanning engine configured to scan and interpret an indicia and a light pipe within a casing of a scanning device. The support frame may include a planar portion that extends between the indicia scanning engine and the light pipe, wherein an external surface of a middle length of the light pipe extends along and flush against a planar surface of the planar portion of the support frame. A holder may be formed integrally with the planar portion to support a light source in a position aligned with an inlet end of the light pipe to enable light emitted by the light source to reach the inlet end. Multiple ribs of elongate shape may be formed integrally with the planar portion. The multiple ribs may extend from the planar surface of the planar portion to strengthen the support frame. A plurality of the ribs of the multiple ribs may each define a gap in the elongate shape through which the middle length of the light pipe may extend. The support frame may support the indicia scanning engine and the light pipe in predetermined relative positions to cause a central projection axis along which light is projected from an outlet end of the light pipe to extend in parallel with a central scanning axis extending from a front end of the indicia scanning engine, and toward a surface that carries the indicia.

In another aspect, a rib of the multiple ribs may be configured to form a diaphragm that is interposed between the light source and the inlet end of the light pipe. The diaphragm may define an aperture through which light emitted by the light source passes to reach the inlet end of the light pipe. The shape of the aperture may define a shape of the light projected from the outlet end of the light pipe.

In another aspect, the casing of the scanning device may include a scanning head portion inside of which the scanning engine, the light pipe and the support frame are located, and an elongate handle portion connected at one end of the handle portion to an external surface of a bottom wall of the scanning head portion. The multiple ribs may extend from the planar surface of the planar portion of the support frame and towards an inner surface of another wall of the scanning head portion of the casing. The other wall of the scanning head portion of the casing may be selected from a group consisting of a top wall of the scanning head portion that is opposite the bottom wall of the scanning head portion, and a side wall of the scanning head portion that extends between the top wall and the bottom wall.

In another aspect, the multiple ribs may engage another component of the scanning device within the scanning head portion to maintain the support frame at a first selected location and orientation within the scanning head portion to enable the support frame to physically support the indicia scanning engine at a second selected location and orientation within the scanning head portion, and the light pipe at a third selected location and orientation within the scanning head portion.

In another aspect, the multiple ribs may engage the inner surface of the other wall of the scanning head portion to maintain the support frame at a first selected location and orientation within the scanning head portion to enable the support frame to physically support the indicia scanning engine at a second selected location and orientation within the scanning head portion, and the light pipe at a third selected location and orientation within the scanning head portion.

In another aspect, the light pipe may include an elongate outlet length interposed between the middle length and the outlet end, and extending in front of the front end of the scanning engine. A first bend may be formed in the light pipe where the middle length and the outlet length of the light pipe meet at a right angle, the first bend including a first angled surface to cause reflection of light transmitted through the middle length from the inlet end and into the outlet length. A second bend may be formed in the light pipe where the outlet length meets the outlet end, the second bend including a second angled surface to cause reflection of light transmitted through the outlet length from the first bend and out of the light pipe through the outlet end.

In another aspect, the light pipe may include an inlet lens at the inlet end to receive light emitted by the light source. An outlet lens may be provided at the outlet end to project the light conveyed through the light pipe from the inlet end to the outlet end.

In another aspect, the casing of the scanning device may include a scanning window formed of a second transparent material. The support frame may physically support the light pipe in a position and orientation relative to the indicia scanning engine to cause the outlet length, the second bend and the outlet end of the light pipe to extend into a position that is interposed between the indicia scanning engine and the scanning window. The indicia scanning engine and the outlet end of the light pipe may be oriented relative to the scanning window to cause the central scanning axis and the central projection axis to extend through the scanning window.

In another aspect, the indicia scanning engine may include a collimated light emitter to emit collimated light along a central illumination axis that extends parallel to the central scanning axis and central projection axis. The collimated light emitter may emit the collimated light to illuminate at least a portion of the indicia during scanning of the indicia.

In another exemplary aspect, a scanning device may include an indicia scanning engine, a light source, a light pipe, and a support frame. The indicia scanning engine may be configured to scan an indicia carried on a surface. The light pipe may be formed of a first transparent material, and include an inlet end to receive light emitted by the light source, an elongate middle length, and an outlet end to project light conveyed through the light pipe from the inlet end and through the middle length to outlet end. The support frame may be configured to physically support the indicia scanning engine and the light pipe in predetermined relative positions within a casing of the scanning device to cause a central projection axis along which light is projected from the outlet end to extend in parallel with a central scanning axis extending from a front end of the indicia scanning engine, and toward the surface that carries the indicia. The support frame may include a planar portion that extends between the indicia scanning engine and the light pipe. An external surface of the middle length of the light pipe may extend along and flush against a planar surface of the planar portion of the support frame.

In another aspect, the support frame may include multiple ribs of elongate shape formed integrally with the planar portion and extending from the planar surface of the planar portion to strengthen the support frame. A plurality of the ribs of the multiple ribs may each define a gap in the elongate shape through which the middle length of the light pipe extends and is supported by the multiple ribs.

The casing of the scanning device may include a scanning head portion inside of which the scanning engine, the light pipe and the support frame are located, and an elongate handle portion connected at one end of the handle portion to an external surface of a bottom wall of the scanning head portion. The multiple ribs may extend from the planar surface of the planar portion of the support frame and towards an inner surface of another wall of the scanning head portion of the casing. The other wall of the scanning head portion of the casing may be selected from a group consisting of a top wall of the scanning head portion that is opposite the bottom wall of the scanning head portion, and a side wall of the scanning head portion that extends between the top wall and the bottom wall.

In another aspect a rib of the multiple ribs may be configured to form a diaphragm that is interposed between the light source and the inlet end of the light pipe. The diaphragm may define an aperture through which light emitted by the light source passes to reach the inlet end of the light pipe. The shape of the aperture may define a shape of the light projected from the outlet end of the light pipe.

In another aspect, the support frame may include a holder formed integrally with the planar portion to support the light source in a position aligned with the aperture of the diaphragm and the inlet end of the light pipe to enable light emitted by the light source to extend through the aperture and into the inlet end.

In another aspect, the light pipe may include an elongate outlet length interposed between the middle length and the outlet end, and extending in front of the front end of the scanning engine. A first bend may be formed in the light pipe where the middle length and the outlet length of the light pipe meet at a right angle, the first bend including a first angled surface to cause reflection of light transmitted through the middle length from the inlet end and into the outlet length. A second bend may be formed in the light pipe where the outlet length meets the outlet end, the second bend including a second angled surface to cause reflection of light transmitted through the outlet length from the first bend and out of the light pipe through the outlet end.

In another aspect, the light pipe may include an inlet lens at the inlet end to receive light emitted by the light source; and an outlet lens at the outlet end to project the light conveyed through the light pipe from the inlet end to the outlet end.

In another aspect, the light source may be positioned behind a rear end of the scanning engine that is opposite the front end of the scanning engine. The light pipe may include a third bend formed in the light pipe where the middle length meets the inlet end, the third bend including a third angled surface to cause reflection of light received at the inlet end and into the middle length.

In another aspect, the casing of the scanning device may include a scanning window formed of a second transparent material. The support frame may physically support the light pipe in a position and orientation relative to the indicia scanning engine to cause the outlet length, the second bend and the outlet end of the light pipe to extend into a position that is interposed between the indicia scanning engine and the scanning window. The indicia scanning engine and the outlet end of the light pipe may be oriented relative to the scanning window to cause the central scanning axis and the central projection axis to extend through the scanning window.

In another aspect, the indicia scanning engine ma include a collimated light emitter to emit collimated light along a central illumination axis that extends parallel to the central scanning axis and central projection axis. The collimated light emitter may emit the collimated light to illuminate at least a portion of the indicia during scanning of the indicia.

In another aspect, a processor may be coupled to the indicia scanning engine and to the light source, and configured to: operate the indicia scanning engine to scan the indicia along the central scanning axis; interpret the scanned indicia to decode data that is encoded within the indicia; and in response to a successful scanning of the indicia and in response to a successful interpretation of the scanned indicia, operate the light source to emit light into the inlet end of the light pipe to cause the projection of light from the outlet end of the light pipe along the central projection axis and onto the surface that carries the indicia to provide a first visual indicator of success in scanning and interpretation of the indicia.

In another aspect, the light source may include a multi-color LED configured to emit more than one predetermined color. The processor may be configured to operate the multi-color LED to emit a first color of the more than one predetermined colors to provide the first visual indicator. The processor may be configured to operate the multi-color LED to emit a second color of the more than one predetermined colors to provide a second visual indicator of failure in at least one of scanning and interpretation of the indicia.

In another aspect, the processor is configured to operate the multi-color LED to emit a third color of the more than one predetermined colors to provide a third indicator of success in scanning and interpretation of multiple indicia carried on the surface.

In another aspect, the processor may be configured to operate the multi-color LED to emit a third color of the more than one predetermined colors to provide a third indicator to guide an operator of the scanning device in aiming the scanning device at the surface that carries the indicia.

The use of a gap in the plurality of ribbing as herein disclosed allows a light-pipe to provide a light emitter inside the scan-engine package overall dimensions, and behind the scanning window of, for example, protective glass. The light source may configured outside the scan-engine, wherever it fits within the space constraints of the casing of the scanning device. The light pipe may be inserted into the gap formed in the plurality of ribbings of the support structure and is oriented to project toward an indicia code. In this way, optical hardware configured to provide a "Green Spot" feature may be fitted within the scanning device without increasing the overall dimensions and without adding weakness related to mechanical and electrical capabilities.

For a scanning device that hosts a scan engine, the support structure of this disclosure provides a mechanical interface between the scan engine and the device main chassis.

The supporting structure may enclose the scan engine in part or completely. Where the supporting structure completely encloses the scan engine, one or more openings are provided for electrical connections and the illumination, Green Spot, and data capture functions.

The supporting unit may be provided with tight mechanical coupling/decoupling between the casing of the scanning device and the scan engine so that shock absorption can be minimized with reduced damage to the fragile parts.

The supporting unit may provide an improved mechanical interface that protects against water, dust and ESD because the optical hardware of this disclosure is contained within the casing of the scanning device.

The supporting unit enables more freedom to design the FOV of the scan engine to better fit the functionality of the device since the FOV is not limited by optical hardware that is not tightly coupled to the scan engine.

The supporting structure may be provided with other illumination and/or signaling systems since these systems may be tightly coupled to the supporting structure and scan engine according to the teachings of this disclosure.

The supporting structure greatly simplifies the chassis design of the scanning engine, the optical hardware, and the scanning device.

In combination, the supporting structure and scan engine provide a robust multi-purpose unit that may provide more features (both mechanical and functional) than those provided by a scan engine alone. And this multi-purpose unit provides these features within a volume of space that is substantially similar to that of the scan-engine.

The supporting structure provides the space and fit for the light pipe and may also provide the structure for holding the light source. The light source may be on any side of the supporting structure and the light pipe connects to the light source in a manner that configures the output end of the light pipe to project light from the light source through the scan window.

The supporting structure with optical hardware implements a visual feedback system on good code read while maintaining the scan engine overall dimensions and the strengths of the structure for receiving and holding the scan engine.

As will be appreciated by one skilled in the art, the scanning device 100 may further include a transceiver (not shown) may employ any of a variety of wireless communications technologies, including and not limited to, radio frequency transmission, transmission incorporated into electromagnetic fields by which electric power may be wirelessly conveyed, and/or any of a variety of types of optical transmission. Additionally, the transceiver may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

In some embodiments, in addition to the image sensor 320, the scanning head may also incorporate a radio-frequency identification (RFID) tag reader to enable RF scanning of RFID tags placed on objects, in addition to or in lieu of the placement of an optically readable indicia on objects. In some embodiments, a single label and/or package associated with an object may carry both an optically readable indicia and an RFID tag.

Additionally, the electrical power and/or data connector may be configured to support an exchange of electric power and/or data transmission signals that adhere to one or more known and widely used standards, including and not limited to RS-232C, RS-422, USB, Ethernet (IEEE-802.3) or IEEE-1394.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A support frame configured to physically support both an indicia scanning engine configured to scan and interpret an indicia and a light pipe within a casing of a scanning device, the support frame comprising:

a planar portion that extends between the indicia scanning engine and the light pipe, wherein an external surface of a middle length of the light pipe extends along and flush against a planar surface of the planar portion of the support frame;

a holder formed integrally with the planar portion to
   support a light source in a position aligned with an inlet
   end of the light pipe to enable light emitted by the light
   source to reach the inlet end; and
multiple ribs of elongate shape formed integrally with the
   planar portion, wherein:
   the multiple ribs extend from the planar surface of the
      planar portion to strengthen the support frame;
   a plurality of the ribs of the multiple ribs each define a
      gap in the elongate shape through which the middle
      length of the light pipe extends; and
   the support frame supports the indicia scanning engine
      and the light pipe in predetermined relative positions
      to cause a central projection axis along which light is
      projected from an outlet end of the light pipe to
      extend in parallel with a central scanning axis
      extending from a front end of the indicia scanning
      engine, and toward a surface that carries the indicia.

2. The support frame of claim 1, wherein:
a rib of the multiple ribs is configured to form a diaphragm that is interposed between the light source and the inlet end of the light pipe; and
the diaphragm defines an aperture through which light emitted by the light source passes to reach the inlet end of the light pipe; and
a shape of the aperture defines a shape of the light projected from the outlet end of the light pipe.

3. The support frame of claim 1, wherein:
the casing of the scanning device comprises a scanning head portion inside of which the indicia scanning engine, the light pipe and the support frame are located, and an elongate handle portion connected at one end of the elongate handle portion to an external surface of a bottom wall of the scanning head portion;
the multiple ribs extend from the planar surface of the planar portion of the support frame and towards an inner surface of another wall of the scanning head portion of the casing; and
the other wall of the scanning head portion of the casing is selected from a group consisting of a top wall of the scanning head portion that is opposite the bottom wall of the scanning head portion, and a side wall of the scanning head portion that extends between the top wall and the bottom wall.

4. The support frame of claim 3, wherein the multiple ribs engage another component of the scanning device within the scanning head portion to maintain the support frame at a first selected location and orientation within the scanning head portion to enable the support frame to physically support the indicia scanning engine at a second selected location and orientation within the scanning head portion, and the light pipe at a third selected location and orientation within the scanning head portion.

5. The support frame of claim 3, wherein the multiple ribs engage the inner surface of the other wall of the scanning head portion to maintain the support frame at a first selected location and orientation within the scanning head portion to enable the support frame to physically support the indicia scanning engine at a second selected location and orientation within the scanning head portion, and the light pipe at a third selected location and orientation within the scanning head portion.

6. The support frame of claim 1, wherein the light pipe comprises:
an elongate outlet length interposed between the middle length and the outlet end, and extending in front of the front end of the indicia scanning engine;
a first bend formed in the light pipe where the middle length and the outlet length of the light pipe meet at a right angle, the first bend comprising a first angled surface to cause reflection of light transmitted through the middle length from the inlet end and into the outlet length; and
a second bend formed in the light pipe where the outlet length meets the outlet end, the second bend comprising a second angled surface to cause reflection of light transmitted through the outlet length from the first bend and out of the light pipe through the outlet end.

7. The support frame of claim 6, wherein the light pipe comprises:
an inlet lens at the inlet end to receive light emitted by the light source; and
an outlet lens at the outlet end to project the light conveyed through the light pipe from the inlet end to the outlet end.

8. The support frame of claim 6, wherein:
the casing of the scanning device comprises a scanning window formed of a second transparent material;
the support frame physically supports the light pipe in a position and orientation relative to the indicia scanning engine to cause the outlet length, the second bend and the outlet end of the light pipe to extend into a position that is interposed between the indicia scanning engine and the scanning window; and
the indicia scanning engine and the outlet end of the light pipe are oriented relative to the scanning window to cause the central scanning axis and the central projection axis to extend through the scanning window.

9. The support frame of claim 1, wherein:
the indicia scanning engine comprises a collimated light emitter to emit collimated light along a central illumination axis that extends parallel to the central scanning axis and the central projection axis; and
the collimated light emitter emits the collimated light to illuminate at least a portion of the indicia during scanning of the indicia.

10. A scanning device comprising:
an indicia scanning engine configured to scan an indicia carried on a surface;
a light source;
a light pipe formed of a first transparent material, and comprising an inlet end to receive light emitted by the light source, an elongate middle length, and an outlet end to project light conveyed through the light pipe from the inlet end and through the middle length to the outlet end; and
a support frame configured to physically support the indicia scanning engine and the light pipe in predetermined relative positions within a casing of the scanning device to cause a central projection axis along which light is projected from the outlet end to extend in parallel with a central scanning axis extending from a front end of the indicia scanning engine, and toward the surface that carries the indicia, wherein:
   the support frame comprises a planar portion that extends between the indicia scanning engine and the light pipe; and
   an external surface of the middle length of the light pipe extends along and flush against a planar surface of the planar portion of the support frame.

11. The scanning device of claim 10, wherein:
the support frame comprises multiple ribs of elongate shape formed integrally with the planar portion and extending from the planar surface of the planar portion to strengthen the support frame; and a plurality of the ribs of the multiple ribs each define a gap in the elongate shape through which the middle length of the light pipe extends and is supported by the multiple ribs.

12. The scanning device of claim 11, wherein:

the casing of the scanning device comprises a scanning head portion inside of which the indicia scanning engine, the light pipe and the support frame are located, and an elongate handle portion connected at one end of the elongate handle portion to an external surface of a bottom wall of the scanning head portion;

the multiple ribs extend from the planar surface of the planar portion of the support frame and towards an inner surface of another wall of the scanning head portion of the casing; and the other wall of the scanning head portion of the casing is selected from a group consisting of a top wall of the scanning head portion that is opposite the bottom wall of the scanning head portion, and a side wall of the scanning head portion that extends between the top wall and the bottom wall.

13. The scanning device of claim 11, wherein:

a rib of the multiple ribs is configured to form a diaphragm that is interposed between the light source and the inlet end of the light pipe; and the diaphragm defines an aperture through which light emitted by the light source passes to reach the inlet end of the light pipe; and the shape of the aperture defines a shape of the light projected from the outlet end of the light pipe.

14. The scanning device of claim 13, wherein the support frame comprises a holder formed integrally with the planar portion to support the light source in a position aligned with the aperture of the diaphragm and the inlet end of the light pipe to enable light emitted by the light source to extend through the aperture and into the inlet end.

15. The scanning device of claim 10, wherein the light pipe comprises:

an elongate outlet length interposed between the middle length and the outlet end, and extending in front of the front end of the indicia scanning engine;

a first bend formed in the light pipe where the middle length and the outlet length of the light pipe meet at a right angle, the first bend comprising a first angled surface to cause reflection of light transmitted through the middle length from the inlet end and into the outlet length; and a second bend formed in the light pipe where the outlet length meets the outlet end, the second bend comprising a second angled surface to cause reflection of light transmitted through the outlet length from the first bend and out of the light pipe through the outlet end.

16. The scanning device of claim 15, wherein the light pipe comprises:

an inlet lens at the inlet end to receive light emitted by the light source; and an outlet lens at the outlet end to project the light conveyed through the light pipe from the inlet end to the outlet end.

17. The scanning device of claim 15, wherein:

the light source is positioned behind a rear end of the indicia scanning engine that is opposite the front end of the indicia scanning engine; and the light pipe comprises a third bend formed in the light pipe where the middle length meets the inlet end, the third bend comprising a third angled surface to cause reflection of light received at the inlet end and into the middle length.

18. The scanning device of claim 15, wherein:

the casing of the scanning device comprises a scanning window formed of a second transparent material;

the support frame physically supports the light pipe in a position and orientation relative to the indicia scanning engine to cause the outlet length, the second bend and the outlet end of the light pipe to extend into a position that is interposed between the indicia scanning engine and the scanning window; and the indicia scanning engine and the outlet end of the light pipe are oriented relative to the scanning window to cause the central scanning axis and the central projection axis to extend through the scanning window.

19. The scanning device of claim 10, wherein:

the indicia scanning engine comprises a collimated light emitter to emit collimated light along a central illumination axis that extends parallel to the central scanning axis and the central projection axis; and the collimated light emitter emits the collimated light to illuminate at least a portion of the indicia during scanning of the indicia.

20. The scanning device of claim 10, further comprising a processor coupled to the indicia scanning engine and to the light source, and configured to:

operate the indicia scanning engine to scan the indicia along the central scanning axis;

interpret the scanned indicia to decode data that is encoded within the indicia; and in response to a successful scanning of the indicia and in response to a successful interpretation of the scanned indicia, operate the light source to emit light into the inlet end of the light pipe to cause the projection of light from the outlet end of the light pipe along the central projection axis and onto the surface that carries the indicia to provide a first visual indicator of success in scanning and interpretation of the indicia.

21. The scanning device of claim 20, wherein:

the light source comprises a multi-color LED configured to emit more than one predetermined color;

the processor is configured to operate the multi-color LED to emit a first color of the more than one predetermined colors to provide the first visual indicator; and the processor is configured to operate the multi-color LED to emit a second color of the more than one predetermined colors to provide a second visual indicator of failure in at least one of scanning and interpretation of the indicia.

22. The scanning device of claim 21, wherein the processor is configured to operate the multi-color LED to emit a third color of the more than one predetermined colors to provide a third indicator of success in scanning and interpretation of multiple indicia carried on the surface that carries the indicia.

23. The scanning device of claim 21, wherein the processor is configured to operate the multi-color LED to emit a third color of the more than one predetermined colors to provide a third indicator to guide an operator of the scanning device in aiming the scanning device at the surface that carries the indicia.

* * * * *